United States Patent [19]

Whittleton et al.

[11] Patent Number: 5,255,867

[45] Date of Patent: Oct. 26, 1993

[54] BALE RIPPER AND CONVEYOR

[76] Inventors: David Whittleton, 1401A-112th Street, North Battleford, Saskatchewan, Canada, S9A 3B1; Leslie Burton-Bzowy, 9-34 Summers Place, Saskatoon, Saskatchewan, Canada, S7H 3W4

[21] Appl. No.: 831,875

[22] Filed: Feb. 6, 1992

[30] Foreign Application Priority Data

Feb. 8, 1991 [CA] Canada ................................ 2036053

[51] Int. Cl.$^5$ ............................................. B02C 18/22
[52] U.S. Cl. ................................ 241/101.7; 241/605; 241/280
[58] Field of Search ...................... 241/605, 101.7, 30, 241/280

[56] References Cited

U.S. PATENT DOCUMENTS

| 3,208,491 | 9/1965 | Bliss | 241/280 |
| 4,390,312 | 6/1983 | Skeem | 241/605 |
| 4,524,916 | 6/1985 | Keyes et al. | 241/605 |
| 4,643,364 | 2/1987 | Lucas | 241/605 |
| 4,657,191 | 4/1987 | Dwyer et al. | 241/605 |
| 5,033,683 | 7/1991 | Taylor | 241/605 |

FOREIGN PATENT DOCUMENTS

| 1038338 | 9/1978 | Canada . |
| 1186598 | 5/1985 | Canada . |
| 1194002 | 9/1985 | Canada . |
| 1251422 | 3/1989 | Canada . |

OTHER PUBLICATIONS

"Haybuster—Big Bale Buster"—Technical Brochure; Haybuster Mfg., Inc.
"Big Bale Grinder"—Techical Brochure; United Farm Tools Inc.
"Kidd Bale Choppers"—Technical Brochure; Kidd Farm Machiner Ltd.
"'175' Round Bale"—Technical Brochure; New Holland (Dec., 1987).
"Roto Grind"—Technical Brochure; Burrow Enterprises Inc.
"Hay Balers"—Technical Brochure; John Deere.

Primary Examiner—Frank T. Yost
Assistant Examiner—Allan M. Schrock
Attorney, Agent, or Firm—Robert M. Phipps

[57] ABSTRACT

The present invention provides a bale ripper and conveyor which disintegrates round bales of forage material. The bales can be loaded into the device without regard to the direction in which they are wrapped. The present invention further comprises a control box and conveyor assembly whereby the speed of operation of the device can be controlled manually and the shredded forage material can be directed to a desired location such as a mix mill.

12 Claims, 5 Drawing Sheets

BALE RIPPER AND CONVEYOR

The present invention pertains to devices used for disintegrating bales of forage material.

BACKGROUND OF THE INVENTION

In the field of agriculture, it is common to collect and bind hay, or other forage material, into round or square bales once it has been cut. This process of baling is carried out by devices specifically designed for this purpose.

Although the baling of hay provides an efficient means of storing the harvested material, the bales of hay must first be ground into loose material before the hay can be used. Following the grinding process, the hay can then be fed to a mix mill or placed directly into feed bunks for animal consumption.

Many devices have been developed for effecting this grinding process.

For example, in Canadian Patent No. 1,251,422 (issued Mar. 21, 1989), Stronski discloses a "Round Bale Retriever/Feeder". The device disclosed in this patent can be used to pick up a round bale and loads it onto the bale ripping, or shredding, mechanism. This mechanism consists of a plurality of cylindrical rotors having radially extending fingers. The bales are loaded onto a conveyor which rolls the bales towards the rotors which, in turn, shred the hay from the bales one layer at a time. The loosened material then exits the device from one side thereof.

Dwyer et al in Canadian Patent No. 1,194,002 (issued Sep. 24, 1985) discloses a "Bale Handling & Shredding Apparatus" which involves a bale ripping mechanism comprising cylindrical rotors having radially extending fingers. A push arm is used to urge the bales towards the ripping mechanism. As before, the loosened material exits from the side of the device.

In Canadian Patent No. 1,038,338 (issued Sep. 12, 1978) Ostrander discloses a "Vehicle For Distributing Straw Or Like Material From Round Bales". In this device, the bales are loaded onto a series of cylindrical rotors having blunt, blade-like projections. In operation, these rotors rotate so as to loosen the straw or like material from the bale such that it falls through openings between the rotors and then onto the ground.

In Canadian Patent No. 1,186,598 (issued May 7, 1985) Morlock et al disclose a "Machine For Loading And Disintegrating Large Bales Of Forage Material". This device comprises a hopper having, at the bottom, a rotating bale support conveyor and, to one side thereof, a cylindrical rotor having radially extending fingers. Once a bale is loaded into the hopper, the bale support conveyor rolls the bale and urges it towards the bale ripping rotor. Material dislodged by the rotor is ejected through the side of the hopper. A deflector is provided whereby the direction of the ejected material can be controlled. Power for the bale support conveyor is provided by a hydraulic motor whereas the shredding rotor is driven by the power take off of a tractor used to tow the device. The hydraulic motor is powered by a hydraulic pump which in turn is powered by the tractor as well.

Although all of these prior art references deal with the shredding or grinding of bales of forage material, none of these references deals with the aspect of providing a means for feeding the shredded material into mix mills. One of the problems in adapting a bale ripper to feed into a mix mill lies in the fact that the flow rate of ejected material from the bale ripper must match the capacity of the mix mill. This would mean, therefore, that the speed at which a bale ripper operates must be adjustable. Since many of the prior art devices are powered by the tractor motor, the speed of the bale ripper can only be adjusted by controlling the rpm's of the tractor's engine.

In the case of round bales, a further problem faced in the shredding process is that the bales must be loaded onto the shredding device in a specific orientation so that the layers of hay, or other forage material, can be shredded in an efficient manner.

SUMMARY OF THE INVENTION

The present invention provides a device which overcomes the problems associated with bale shredding devices known in the art. Specifically, the present invention provides a bale ripping and conveying device into which a round bale of foraged material can be placed regardless of the direction in which the bale is wrapped. Further, the disclosed invention provides a bale shredding device which can be adapted to deposit forage material, shredded from a bale, onto the ground, into feed bunks or into a mix mill. The speed of operation of the device can be easily controlled so as to facilitate the feeding of material into a mix mill.

Thus, the present invention provides for a device, for unwrapping a round bale of forage material, comprising a support frame, a bale supporting means, and a bale ripping means mounted on each side of the bale supporting means and positioned so as to engage the sides of the bale when loaded on to the support means.

The present invention also provides for a device, for unwrapping a round bale, comprising:
 a support frame;
 bale support means on the frame;
 rotating bale ripping means mounted on both sides of the bale support means and positioned so as to engage both sides of the bale when the bale is loaded on the bale support means; the bale support means comprising a reversibly rotating bale support conveyor adapted to engage the bale whereby the bale is rolled on its side and urged towards the bale ripping means;
 the bale ripping means comprising a pair of cylindrical rotors, one on each side of the bale support conveyor, rotating about their longitudinal axes toward the centre of the device and having a plurality of radially extending fingers, along the longitudinal axes thereof, for engaging the bale;
 a first conveyor assembly mounted underneath the bale support means whereby material removed by the bale ripping means is received by the first conveyor and transferred to the rear of the device;
 a second conveyor assembly mounted on the rear end of the device for transferring material from the first conveyor assembly away from the device to a desired location, the second conveyor assembly being pivotally attached to the device thereby permitting both vertical and horizontal movement of the second conveyor; and,
 variable speed hydraulic motors for supplying power to the bale support means, the bale ripping means and the first and second conveyors.

BRIEF DESCRIPTION OF THE DRAWINGS

These and other features of the invention will become more apparent from the following description in which reference is made to the appended drawings wherein like reference numerals are used to refer to like elements and wherein.

DESCRIPTION OF THE PREFERRED EMBODIMENTS

Figure 1:
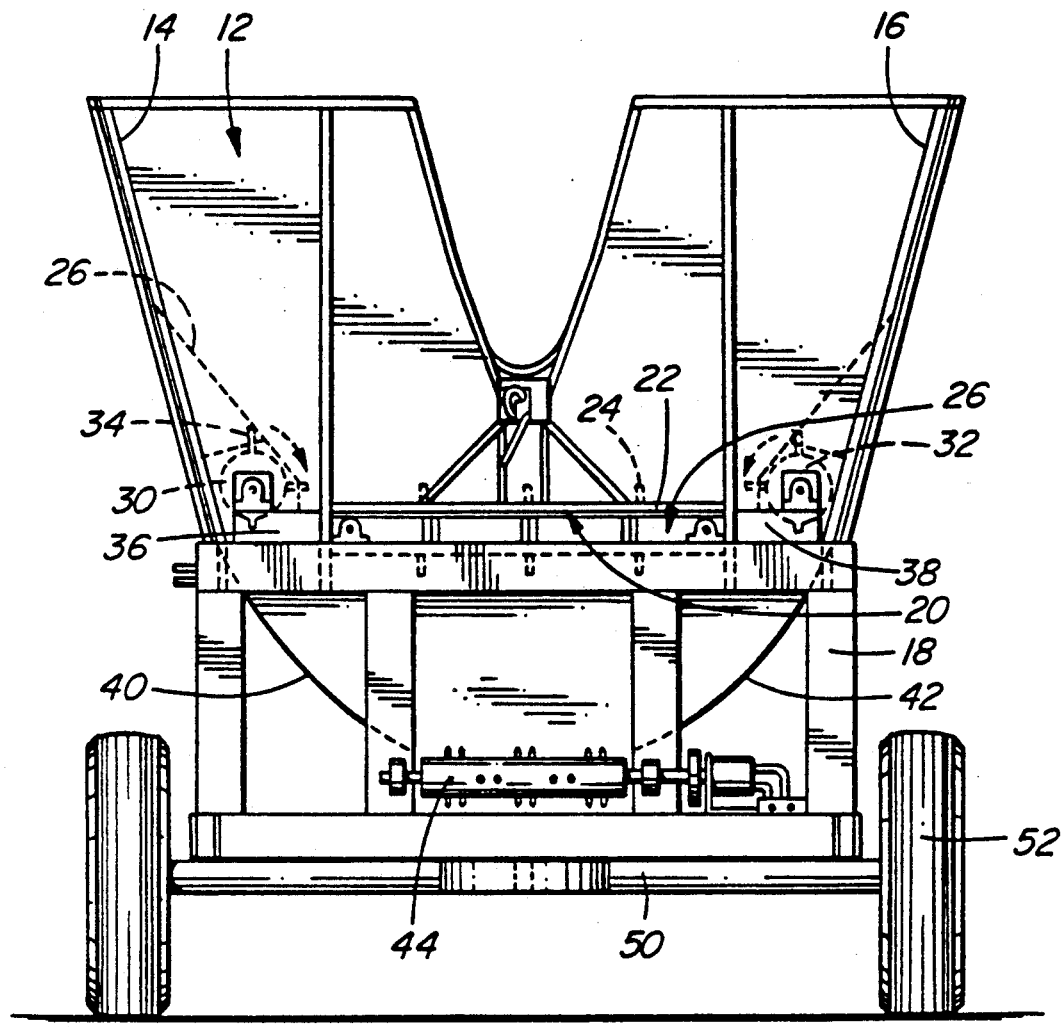
FIG. 1 is a cross-sectional rear elevation of the bale ripper and conveyor.

FIG. 1 shows the bale ripper and conveyor generally at 10. The device comprises a support frame 18 and a hopper 12. A round bale of forage material, when loaded into the hopper 12, rests on its side on a "support table 20. Support table 20 comprises a movable support surface or conveyor 22 having finger like projections 24 which engage the bale and thereby rotate the bale as the conveyor 22 is rotated. The conveyor 22 is reversibly rotatable in both clockwise and counterclockwise directions towards either the left or right side of the device. In the preferred case, the direction of rotation of conveyor 22 should be opposite to that in which the bales are wrapped.

Sidewalls 14 and guides maintain the bale in the hopper 12 and on support table 20 as the bale is rotated.

First and second ripping means, each including a stripper roller 30 and 32 respectively are positioned on either side of support table 20, the rollers being attached to support frame 18. Along the lengths of rollers 30 and 32 radially extend finger like projections 34. Rollers 30 and 32 rotate about their longitudinal axes in a direction towards the center of hopper 12. In doing so, fingers 34 engage the bale thereby stripping away forage material from the bale, one layer at a time.

Conveyor 22 urges the bale to either of the stripper rollers 30 or 32 depending upon which direction the conveyor is rotating. In accordance with the preferred embodiment, if a bale in the hopper 12 is wrapped in a clockwise manner, conveyor 22 is rotated in the counterclockwise direction thus forcing the bale towards stripper roller 30. In this case, stripper roller 32 also engages the bale and helps in rotating it. It will be understood that the opposite situation would occur if the bale, when loaded in the hopper, is found to be wrapped in a counterclockwise manner.

As forage material is stripped off the bale by the stripper rollers 32 and 30, it falls through spaces 36 and 38 between the rollers 32 and 30 and support table 20. Upon falling through these spaces the shredded material is diverted by concave plates 40 and 42 on to a second conveyor 44. Conveyor 44 rotates in a direction parallel to the longitudinal plane of the device and transports material towards the rear of the bale ripper.

An axle 50 is attached to the underside of support frame 18. Wheels 52 are attached on both ends of axle 50.

Figure 2:
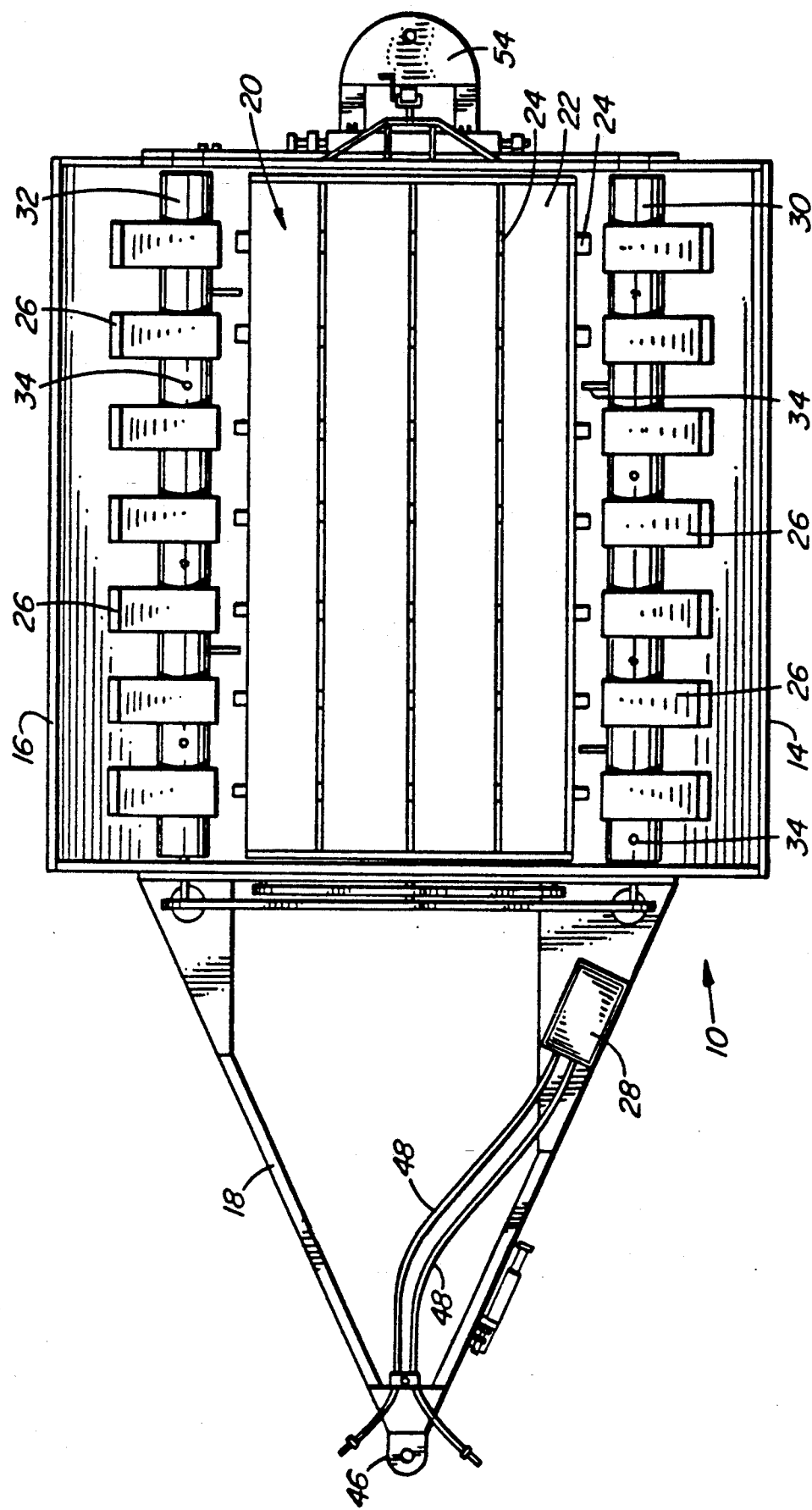
FIG. 2 is a plan view of the device.

As illustrated in FIG. 2, guides 26 comprise strips of sheet metal extending downward from the inner sides of sidewalls 14 and 16 towards support table 20, thereby overlapping stripper rollers 30 and 32. Adequate clearance is provided between the terminal edges of guides 26 and projections 24 on conveyor 22, so as to prevent obstruction of the conveyor when rotating. Projections 34, from stripper rollers 30 and 32, extend between guides 26 along the entire length of each of the rollers. Projections 24 extend perpendicular to, and evenly across, conveyor 22.

The support frame 18 of the device also includes a trailer hitch 46 which enables the bale ripper and conveyor apparatus 10 to be attached to a tractor. Hydraulic hoses 48 connect the hydraulic control box 28 to the tractor engine which serves as the power supply. From support frame 18 also extends a second hitch 54 to which is attached a further conveyor assembly shown in FIG. 5.

Figure 3:
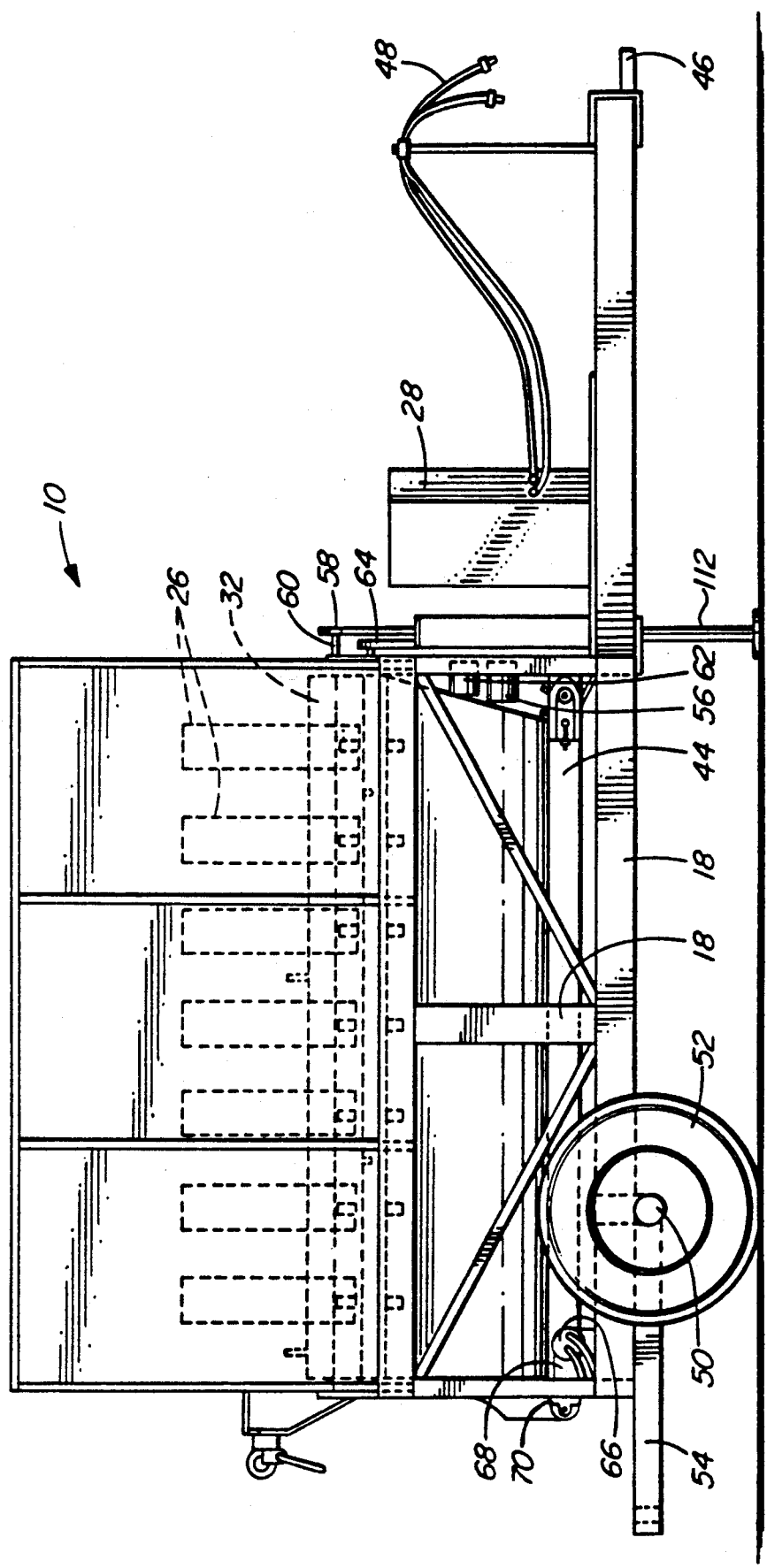
FIG. 3 is a side elevation of the device illustrating the left side thereof.

In FIG. 3, a side view of the bale ripper 10 is shown. Hydraulic motor 56, connected to control box 28 by means of a hydraulic hose, powers the stripper rollers 30 and 32. An endless belt 58 connects motor 56 to a spindle 60 attached to the end of roller 32. A similar type of arrangement is used to connect motor 56 to the other stripper roller 30. A second hydraulic motor 62 is used to power the support table conveyor 22. Motor 62 is connected to control box 28 by means of a hydraulic hose. An endless chain 64 connects motor 62 to gears on both sides of support table 20. A third hydraulic motor 66 also connected to control box 28 by hydraulic hoses, powers the lower conveyor 44. An endless belt 68 connects motor 66 to a spindle 70 thereby resulting in rotation of conveyor 44. Control box 28 includes manual controls for all the hydraulic motors included in the bale ripper and conveyor device. Thus, the speed of each motor can be controlled individually as desired. Furthermore, hydraulic motor 62 is reversible thus allowing for either clockwise or counterclockwise rotation of conveyor 22. The direction of hydraulic motor 22 is controlled via control box 28.

Figure 4:
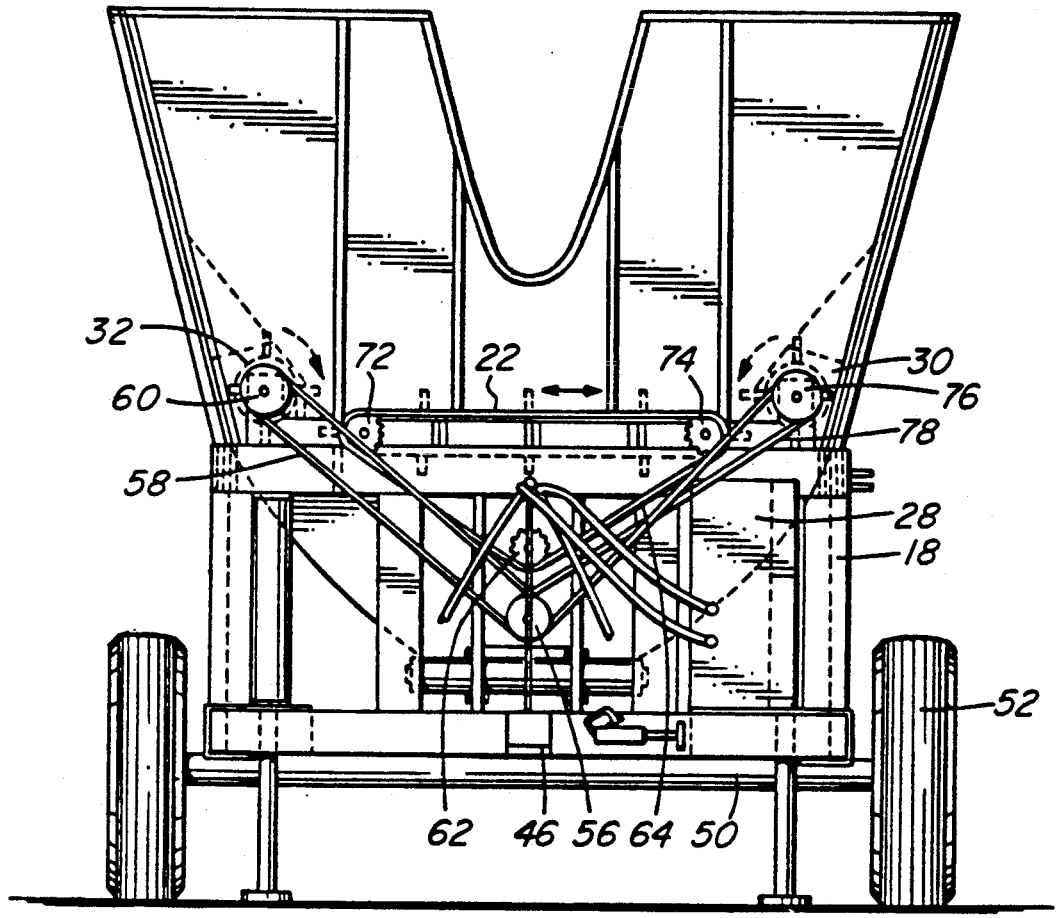
FIG. 4 is a front elevation of the device.

FIG. 4 illustrates the connection between the conveyor 22, stripper rollers 30 and 32, and their respective hydraulic motors. As described above, gears 72 and 74 are attached to rollers on both sides of conveyor 22. A reversible hydraulic motor 62 is connected to gears 72 and 74 by means of an endless chain 64. Hydraulic motor 56 is connected to spindles 60 and 76, on stripper rollers 30 and 32, by means of endless belts 58 and 78.

Figure 5:
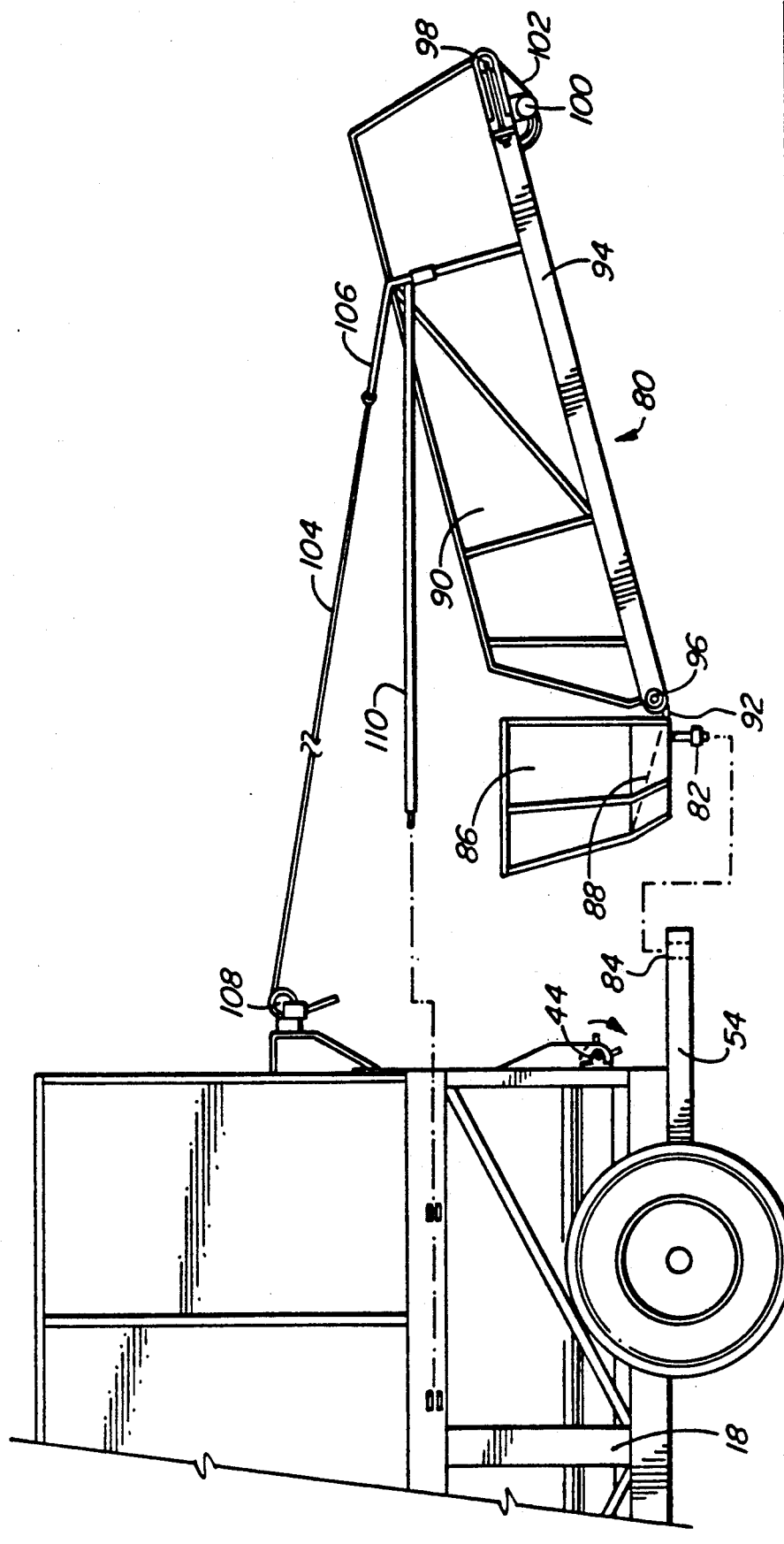
FIG. 5 is a side elevation of the device illustrating the right side thereof.

FIG. 5 shows another side view of the bale ripper illustrating the third conveyor apparatus 80. Conveyor apparatus 80 is pivotally attached to hitch 54 on the bale ripper by inserting pin 82 into opening 84 on hitch 54, thereby enabling apparatus 80 to pivot in a horizontal plane. A first section 86 of conveyor apparatus 80 receives shredded material from the second conveyor 44. First section 86 includes an essentially semi-circular plate 88 which is sloped downwards away from bale ripper 10, and towards a second section 90. The second section 90 of conveyor apparatus 80 is attached to tie first section 86 at hinge 92, thereby enabling second section 90 to pivot in a vertical plane. Second section 90 comprises a conveyor 94 which extends along its length, between rollers 96 and 98. Hydraulic motor 100 is connected to roller 98 by means of an endless belt 102 thereby enabling rotation of conveyor 94 in a direction away from the bale ripping device 10. Hydraulic motor 100 is, in turn, connected to control box 28 thereby enabling manual control of the speed of motor 100.

Second section 90 also includes a support bracket 106 to which is attached cable 104. Cable 104 is, in turn, connected to winch 108 which enables the second section 90 to be raised or lowered as required. In the preferred embodiment, a steadying bar 110, connected to second section 90 and the support frame 18 of bale ripper 10, is used to secure the second section 90 at the desired position. In this manner, forage material shredded by the bale ripper 10 can be directed, by conveyor apparatus 80, to any location such as a feed bunker located close to the ground or a mix mill.

In the preferred embodiment, the bale ripper 10 also includes a support leg 112 allowing for the device to stand or operate Without being secured to a tractor.

Thus, in operation, the bale ripper and conveyor disintegrates bales of forage material and provides a means of directing the material, so shredded, to a desired location. In the case of feeding material into a mix mill, the hydraulic control box on the device allows for easy manual adjustment of all hydraulic motors on the device, thereby allowing the operating speed of the device to correspond to the capacity of the mix mill. Further, a reversibly rotating bale support conveyor and dual stripper rollers allow for a round bale of forage material to be placed into the hopper of the device without regard to the direction in which the bale is wrapped.

While the invention has been described in connection with a specific embodiment thereof and in a specific use, various modifications thereof will occur to those skilled in the art without departing from the spirit and scope of the invention as set forth in the appended claims.

The terms and expressions which have been employed in the specification are used as terms of description and not of limitations, and there is no intention in the use of such terms and expressions to exclude any equivalents of the features shown and described or portions thereof, but it is recognized that various modifications are possible within the scope of the claims to the invention.

The embodiments of the invention in which an exclusive property or privilege is claimed are defined as follows:

1. A device for unwrapping and disintegrating a round bale, said device having left and right sides and front and rear ends and comprising:
   a support frame;
   first ripping means for shredding said bale;
   second ripping means for shredding said bale, spaced in a horizontal plane a predetermined distance from said first ripping means to at least accommodate said bale to be ripped therebetween;
   bale support means on said frame disposed between said first and second ripping means and having a continuous movable support surface disposed in said horizontal plane for supporting said bale thereon, said support surface being selectively movable in a direction toward either said first ripping means or said second ripping means;
   said bale support surface being spaced from said first and second ripping means to that said shredded material is discharged through said space between said support surface and said respective one of said first or second ripping means; and
   projections extending from said support surface for bearing into said bale to rotate and thereby unroll said bale while it is urged against said first or second ripping means as said support surface is selectively moved.

2. A device as claimed in claim 1 including a first conveyor assembly mounted underneath said bale support means whereby said shredded material is received by said first conveyor and transferred to the rear of said device.

3. A device as claimed in claim 2, said first and second bale ripping means each being a cylindrical rotor, rotatable about its respective longitudinal axes toward the centre of said device and having a plurality of radially extending fingers, spaced along the longitudinal axes thereof, for engaging and shredding said bale, one of said rotors aiding the rotation of said bales as it is unrolled.

4. A device as claimed in claim 3 further comprising bale retaining side walls to prevent displacement of said bale from said bale support conveyor.

5. A device as claimed in claim 4 further comprising guide walls for directing said shredded material onto said first conveyor assembly.

6. A device as claimed in claim 5 wherein said bale support means, said first conveyor and said first and second ripping means are driven by variable speed hydraulic motors.

7. A device as claimed in claim 6 further comprising a control box whereby the speeds of said hydraulic motors are controlled.

8. A device as claimed in claim 7 adapted at the rear end thereof to receive a second conveyor assembly for transferring material from said first conveyor assembly away from said device to a desired location.

9. A device as claimed in claim 8 wherein said second conveyor assembly is pivotally attached to said device thereby permitting both vertical and horizontal movement of said second conveyor.

10. A device as claimed in claim 9 wherein said device further includes a variable speed motor for supplying power to said second conveyor.

11. A device for unwrapping and disintegrating a round bale, said device having left and right sides and front and rear ends and comprising:
    a support frame;
    first ripping means for shredding said bale;
    second ripping means for shredding said bale, spaced in a horizontal plane a predetermined distance from said first ripping means to at least accommodate said bale to be ripped therebetween;
    bale support means on said frame disposed between said first and second ripping means and having a continuous movable support surface disposed in said horizontal plane for supporting said bale thereon, said support surface being selectively movable in a direction toward either said first ripping means or said second ripping means;
    said bale support surface being spaced from said first and second ripping means to that said shredded material is discharged through said space between said support surface and said respective one of said first or second ripping means; and
    projections extending from said support surface for bearing into said bale to rotate and thereby unroll said bale while it is urged against said first or second ripping means as said support surface is selectively moved;
    a first conveyor assembly mounted underneath said bale support means whereby said shredded material is received by said first conveyor and transferred to the rear of said device;
    a second conveyor assembly mounted on the rear end of said device for transferring material from said first conveyor assembly away from said device to a desired location; and said second conveyor assembly being pivotally attached to said device thereby permitting both vertical and horizontal movement of said second conveyor.

12. A device as claimed in claim 11, said first and second bale ripping means each being a cylindrical rotor, rotatable about its respective longitudinal axes toward the centre of said device and having a plurality of radially extending fingers, spaced along the longitudinal axes thereof, for engaging and shredding said bale, one of said rotors aiding the rotation of said bales as it is unrolled.

* * * * *